United States Patent [19]
Inagaki

[11] Patent Number: 6,000,805
[45] Date of Patent: Dec. 14, 1999

[54] MIRROR ASSEMBLY FOR AUTOMOBILE

[75] Inventor: Bunji Inagaki, Aichi-ken, Japan

[73] Assignee: Kabushiki Kaisha Tokai Rika Denki Seisakusho, Aichi, Japan

[21] Appl. No.: 09/129,676

[22] Filed: Aug. 6, 1998

[30] Foreign Application Priority Data

Aug. 7, 1997 [JP] Japan ................................. 9-213040

[51] Int. Cl.⁶ .................................................. G02B 7/182
[52] U.S. Cl. ........................ 359/871; 359/872; 359/873; 359/874; 359/876
[58] Field of Search .................................. 359/871, 872, 359/873, 874, 876; 248/477, 479, 487

[56] References Cited

U.S. PATENT DOCUMENTS

| 4,380,370 | 4/1983 | Mittelhauer | 359/871 |
|---|---|---|---|
| 4,925,289 | 5/1990 | Cleghorn et al. | 248/477 |
| 5,425,523 | 6/1995 | Madey et al. | 248/466 |
| 5,636,071 | 6/1997 | Mochizuki et al. | 359/871 |
| 5,724,199 | 3/1998 | Hu | 359/871 |

FOREIGN PATENT DOCUMENTS

| 0196608A2 | 10/1986 | European Pat. Off. . |
|---|---|---|
| 2525166 | 10/1983 | France . |
| 3635920C1 | 6/1988 | Germany . |
| 59-230839 | 12/1984 | Japan . |
| 60-37856 | 11/1985 | Japan . |
| 9200412 | 5/1993 | Netherlands . |

*Primary Examiner*—Cassandra Spyrou
*Assistant Examiner*—Mohammad Sikder
*Attorney, Agent, or Firm*—Birch Stewart Kolasch & Birch, LLP

[57] ABSTRACT

An automobile mirror assembly in which a value of resistance of a rotary variable resistor with an actuator that is driven to rotate by a mirror push-pull operation shaft being moved in its axial direction at time of adjusting a posture of a mirror in the assembly, varies generally linearly when the mirror push-pull operation shaft moves linearly in the axial direction. The mirror push-pull operation shaft has a flat rear end face, and the actuator has one end that forms arc-shaped in which the flat rear end face thereof contacts the one end thereof, and in which the other end of the actuator is fixed to a rotation shaft of the rotary variable resistor. The arc of the arc-shaped one end of the actuator is included within a revolving plane within which the actuator is rotated.

2 Claims, 5 Drawing Sheets

MIRROR ASSEMBLY FOR AUTOMOBILE

BACKGROUND OF THE INVENTION

1. Field of the Invention

The present invention relates to a mirror assembly for an automobile in which a position or posture of a mirror thereof is detected and adjusted electrically.

2. Description of the Related Art

Conventionally, there has been provided one type of a mirror assembly for an automobile having a mechanism for electrically detecting and adjusting a position or posture of a mirror thereof, for the purpose of realizing a better mirror position or posture which depends upon a position or posture of a driver in a car equipped with the mirror assembly (see Japanese Laid-Open Utility Model Publication No. 60-37856, for example).

On the other hand, there has been suggested another type of mirror assembly for an automobile, the general construction of which is shown in FIG. 2, which is so constructed that a mirror position detector (mirror posture detector) 4 is mounted on a rear end side of a mirror push-pull operation shaft 2 mounted on a rear side of a mirror 1. It is to be noted that FIG. 2 is a plan view, as an explanatory view, showing partially in cross section a mirror assembly for an automobile according to one embodiment of the present invention, where its basic construction is common to the construction used in the conventional mirror assembly.

With reference to FIG. 2, and FIG. 1 in which a main part, indicated by a circle, of FIG. 2 is conventional, a description is made below on the conventional mirror assembly for the automobile.

In FIG. 2, which illustrates the one embodiment of the present invention, a reference numeral 1 denotes a mirror; 3 denotes a mirror holder for holding the mirror 1 from the rear side thereof; 2 denotes a mirror push-pull operation shaft one end of which is connected to the mirror holder 3 and the other end of which has a rear end face 60; 5 denotes a rotary variable resistor for detecting an angular change of the mirror 1 as a change of value of resistance thereof; 8 denotes an actuator that is fixed to the rotary variable resistor 5 and that has a contact face 12 forming on the side of the rear end face 60 of the mirror push-pull operation shaft 2; 9 denotes a drive unit for moving the mirror push-pull operation shaft 2 in its axial direction; and 4 denotes a mirror position detector (mirror posture detector) that includes both the rotary variable resistor 5 and the actuator 8. All these parts and members are accommodated in an unshown visor.

Referring to the figure, when the mirror push-pull operation shaft 2 is driven to move axially by the drive unit 9, the mirror holder 3, which supports the mirror 1 and which is supported by a pivotal support portion, inclines universally, while the position of the mirror 1 is detected by the mirror position detector 4. The mirror holder 3 has a holding portion for holding the mirror 1 on a peripheral part of its front face, a connecting portion to which the mirror push-pull operation shaft 2 is connected on a peripheral part of its rear face, and a pivotal support portion for allowing the mirror holder 3 to universally incline about its central part.

The one end, as described above, of the mirror push-pull operation shaft 2 is connected to the mirror holder 3. With the mechanism, the mirror 1 is driven to incline when the mirror push-pull operation shaft 2 is moved axially. At this time, the other end of the mirror push-pull operation shaft 2 rotates the actuator 8 of the mirror position detector 4 with the rear surface 60 of the other end of the mirror push-pull operation shaft 2 contacting the contact surface 12 of the actuator 8 so that the position or posture of the mirror 1 is detected.

More specifically, the mirror position detector 4 is constructed as follows. That is, the actuator 8 is fixed to a rotation shaft 13 of the rotary variable resistor 5, and a center of rotation of the actuator 8 (namely, a direction in which the rotation shaft 13 extends) is perpendicular to the axial direction of the mirror push-pull operation shaft 2.

The rotary variable resistor 5 detects a change in rotational angle of the actuator 8 as a change in value of resistance. Accordingly, an axial linear displacement of the mirror push-pull operation shaft 2 is first converted into a change in rotational angle of the rotary variable resistor 5, and then the change in rotational angle of the rotary variable resistor 5 is converted into a change in value of resistance thereof.

With the mechanism, the position or posture of the mirror 1 can be detected from the change in value of resistance of the rotary variable resistor 5 in the mirror position detector 4, or from the change in rotational angle thereof.

In the conventional mechanism, a contacting part between a mirror push-pull operation shaft 102 and an actuator 108 is as follows. That is, referring to FIG. 1, a rear end face 106 of the mirror push-pull operation shaft 102 is flat in shape, and a contact face 112 of the actuator 108 is square-bar shaped or plate shaped, in which these parts 106, 112 are normally kept in contact with each other.

However, the conventional mirror assembly for the automobile shown in FIG. 1 has a following technical problem.

Namely, when the rear end face 106 of the mirror push-pull operation shaft 102 is positioned at a rear end face upper position 106a or a rear end face lower position 106b, relative to a standard position shown by a solid line in the figure, where a distance or displacement between the rear end face upper position 106a and the standard position is equal to a distance or displacement between the rear end face lower position 106b and the standard position, the actuator 108 is positioned at an actuator upper position 108a or an actuator lower position 108b, respectively, with respect to the standard position. In FIG. 1, the distance between the rear end face upper position 106a and the standard position, and the distance between the rear end face lower position 106b and the standard position, are both indicated by a displacement $\Delta x$.

In the operation, when the actuator 108 is at the actuator standard position, the contact point between the actuator 108 and the rear end face 106 of the mirror push-pull operation shaft 102 is at a contact standard position 111. Meanwhile, when the actuator 108 is at the actuator upper position 108a, the contact point between the actuator 108 and the rear end face 106 of the mirror push-pull operation shaft 102 is at a contact upper position 111a. Meanwhile, when the actuator 108 is at the actuator lower position 108b, the contact point between the actuator 108 and the rear end face 106 of the mirror push-pull operation shaft 102 is at a contact lower position 111b. In the operation, the distance between the contact upper position 111a and a center of the rotation shaft 13, is greater than the distance between the contact lower position 111b and the center thereof.

As the mirror push-pull operation shaft 102 moves axially so that the rear end face 106 thereof moves from the rear end face upper position 106a to the rear end face lower position 106b, the contact point 111 moves from the contact upper position 111a to the contact lower position 111b; namely, the contact point 111 moves over a distance corresponding to a diameter of the mirror push-pull operation shaft 102.

Provided that an angle forming between the actuator at the actuator upper position 108a and the actuator at the actuator standard position is QA, and provided that an angle forming between the actuator at the actuator lower position 108b and the actuator at the actuator standard position is QB, there is a relation QA<QB therebetween; namely, the two angles are not equal to each other. This means that the actuator 108 does not rotate linearly even if the rear end face 106 of the mirror push-pull operation shaft 102 is displaced or moved linearly. In other words, even if the mirror push-pull operation shaft 102 is displaced or moved linearly, the change in value of resistance of the rotary variable resistor 5 is not linear, and the value of resistance of the rotary variable resistor 5 varies with a state in which the value of resistance thereof deviates from its expected linear change.

In order to compensate this deviation, there has been required a complex detection circuit; otherwise, resulting in a poor detection accuracy of the mirror position or posture.

SUMMARY OF THE INVENTION

Therefore, one object of the present invention is to provide a mirror assembly that is used for an automobile, in which a value of resistance of the rotary variable resistor changes generally linearly when the mirror push-pull operation shaft is moved linearly in the axial direction thereof.

In accomplishing this and other objects of the present invention, according to one aspect thereof, there is provided a mirror assembly that is used for an automobile, comprising: a mirror; a push and pull operation shaft for tilting the mirror, in which one of ends of the push and pull operation shaft is connected to a rear side of the mirror, and in which the mirror is tilted when the push and pull operation shaft is moved in an axial direction of the push and pull operation shaft; and a posture detector, having a rotary actuator with a rotation axis, for detecting a posture of the mirror, in which the posture detector is provided on a side of the other of ends of the push and pull operation shaft, in which the rotary actuator has an end, opposite the rotation axis, with a contact surface that contacts a rear surface of the other of ends of the push and pull operation shaft, in which the posture detector comprises a rotary variable resistor a rotation shaft of which is connected to the rotation axis of the rotary actuator, and in which the rotation axis of the rotation actuator is perpendicular to the axial direction of the push and pull operation shaft, wherein one of the rear surface thereof and the contact surface thereof is a surface in a shape of a circular arc, in which the other of the rear surface thereof and the contact surface thereof is one of a surface in a shape of a circular arc and a flat surface, and in which the circular arc is within a rotation plane within which the rotary actuator is rotated.

According to the mechanism, when the push and pull operation shaft is driven to move in the axial direction thereof, for example, by a driving unit which is provided inside the mirror assembly, the push and pull operation shaft is moved with the rear surface thereof contacting the contact surface of the rotary actuator. Accompanying this movement, the rotary actuator is rotated about the rotation axis, which in turn rotates the rotary variable resistor about the rotation shaft which is connected to the rotation axis of the rotary actuator. At this time, the value of resistance of the rotary variable resistor changes in accordance with the amount of rotation of the rotary actuator. The rear surface of the push and pull operation shaft and the contact surface of the rotary actuator, contact to each other in vicinity of an apex or summit of the circular arc. With the construction, when the pull and push operation shaft is moved in the axial direction, its contacting point between the rear surface thereof and the contact surface thereof moves over only a small distance in vicinity of the apex or summit of the circular arc, within or along the plane within which the rotary actuator is rotated. Consequently, the amount or displacement (or movement) of the push and pull operation shaft in the axial direction, is generally linearly converted into the amount or angle of rotation of the rotary actuator so that the former amount thereof generally corresponds the latter amount thereof (or so that the former amount thereof is generally proportional to the latter amount thereof). As a result, the value of resistance of the rotary variable resistor changes generally linearly as well.

With the construction, the position or posture of the mirror can be detected directly from the value of resistance of the rotary variable resistor, without employing any complex converting circuit or device.

According to another aspect of the present invention, there is provided a mirror assembly that is used for an automobile, comprising: a push and pull operation shaft for tilting a mirror, in which the push and pull operation shaft has a rear end; and a rotary variable resistor, as a position detector for detecting a position of the mirror, in which the rotary variable resistor has an actuator with a contact part that contacts the rear end of the push and pull operation shaft, wherein one of the rear end thereof and the contact part thereof has a surface in a shape of a circular arc, and wherein an amount of movement of the push and pull operation shaft in an axial direction thereof generally linearly corresponds to an amount of rotation of the actuator of the rotary variable resistor.

In the construction, the contact part of the actuator contacts the rear end of the push and pull operation shaft. Therefore, accompanying the movement of the push and pull operation shaft in an axial direction thereof for example, the actuator is rotated, thus in turn rotating the rotary variable resistor.

With the construction, the value of resistance of the rotary variable resistor changes generally linearly as well.

With the construction, the position or posture of the mirror can be detected directly from the value of resistance of the rotary variable resistor, without employing any complex converting circuit or device.

BRIEF DESCRIPTION OF THE DRAWINGS

This and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
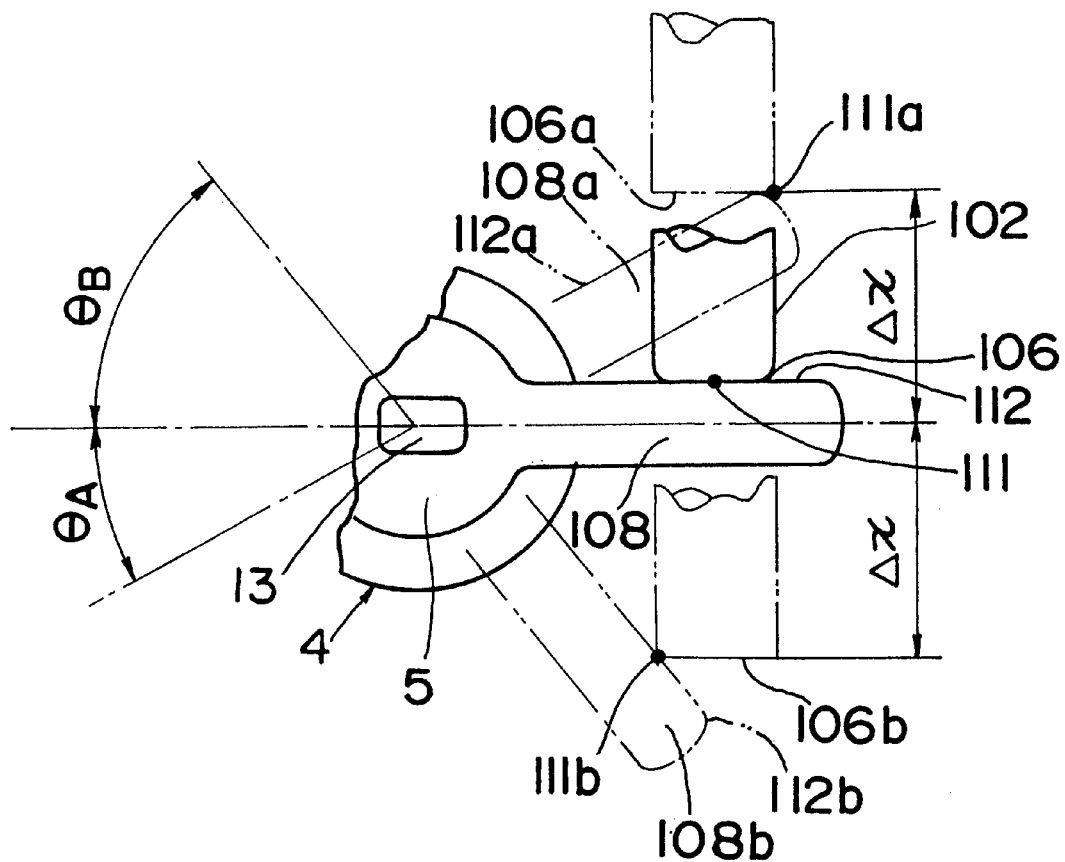
FIG. 1 is a plan view, as an explanatory view, of a main part of a mirror assembly for an automobile according to a prior art, showing how it operates.

Before a description of the present invention proceeds, it is to be noted that like or corresponding parts are designated by like reference numerals throughout the accompanying drawings.

Hereinbelow, the description is made upon mirror assemblies for automobiles according to a first embodiment and a second embodiment of the present invention, and according to a modification of the embodiment thereof, with reference to FIGS. 2 through 7.

First, referring to FIGS. 2, 3, 4 and 7, the description is made below upon the mirror assembly for the automobile according to the first embodiment of the present invention.

Figure 2:
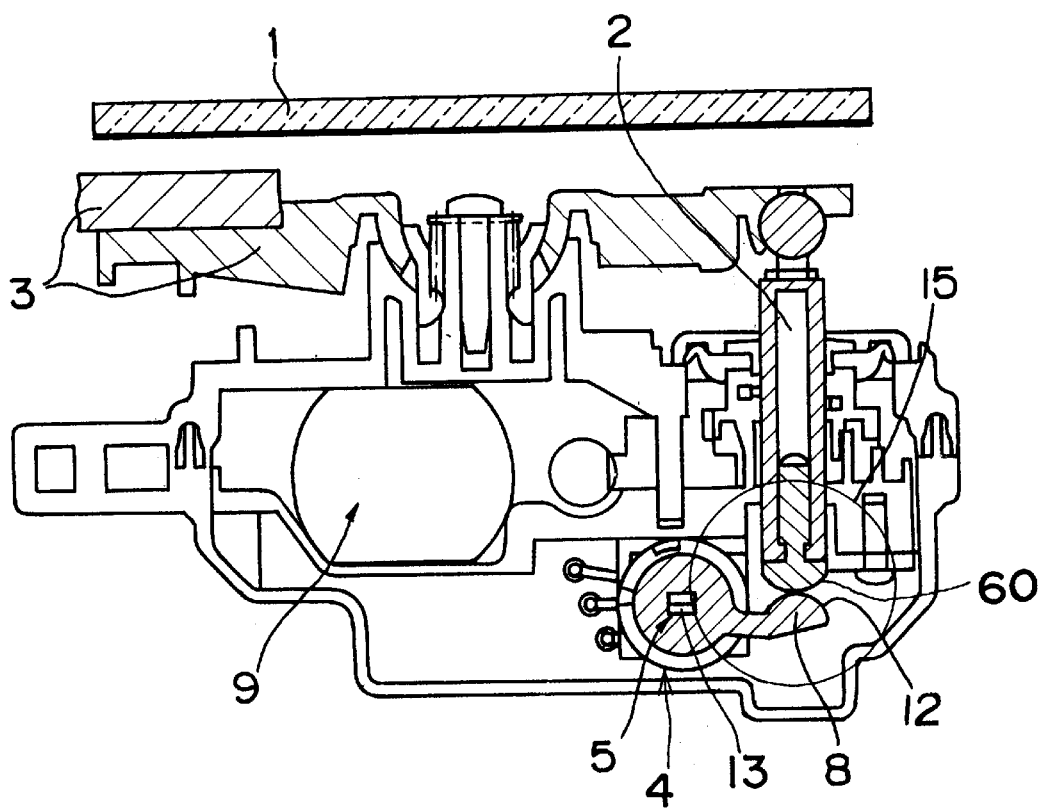
FIG. 2 is a plan view showing partially in cross section a mirror assembly for an automobile according to a modification of an embodiment of the present invention.

FIG. 2 is a plan view, as an explanatory view, showing partly in cross section a general construction of a mirror assembly for an automobile according to a modification of the present invention. A description of the basic construction of the mirror assembly for the automobile has been explained above; therefore, the description thereof and its functions are omitted below.

Figure 3:
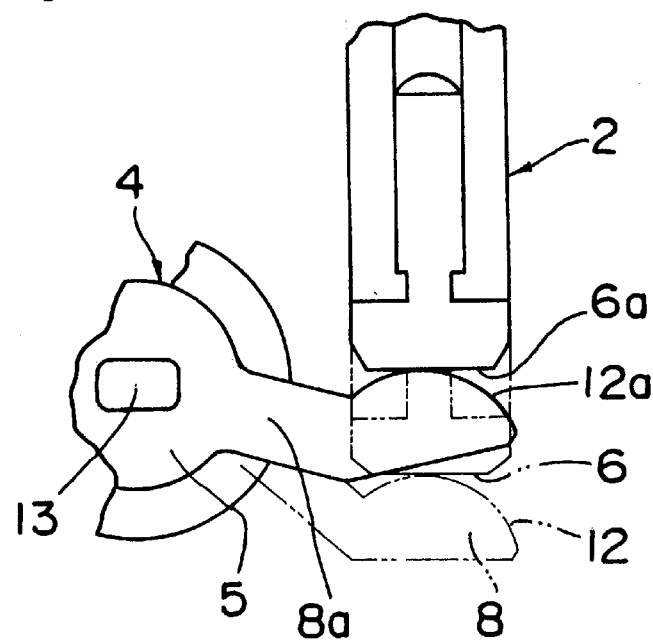
FIG. 3 is a plan view, as an explanatory view, of a main part of a mirror assembly for an automobile according to a first embodiment of the present invention, showing how it operates.
Figure 4:
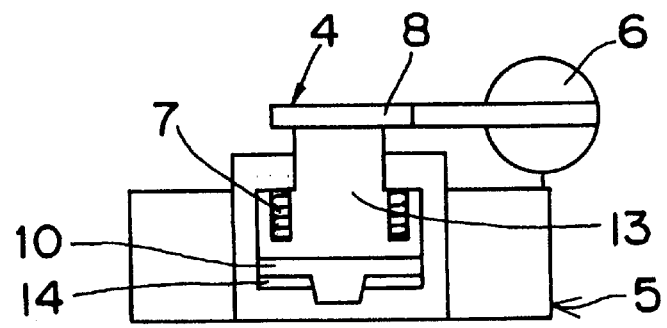
FIG. 4 is a side view of the main part of the mirror assembly for the automobile of FIG. 3.

FIG. 3 is a plan view, as an explanatory view, of a main part of a mirror assembly for an automobile according to the first embodiment of the present invention, showing how it operates; FIG. 4 is a side view of the main part of the mirror assembly for the automobile of FIG. 3; and FIG. 7 is a schematic view showing a principle of how the mirror assembly for the automobile according to the embodiment of the present invention operates.

In the figure, a reference numeral 6 denotes a rear end face of a mirror push-pull operation shaft 2 that is located at a rear end face standard position; 6a denotes the rear end face of the mirror push-pull operation shaft 2 that is located at a rear end face upper position; 6b denotes the rear end face of the mirror push-pull operation shaft 2 that is located at a rear end face lower position; 8 denotes an actuator that is located at an actuator standard position; 8a denotes the actuator that is located at an actuator upper position; 8b denotes the actuator that is located at an actuator lower position; 12 denotes a contact surface of the actuator 8 that is located at the actuator standard position; 12a denotes the contact surface of the actuator 8 that is located at the actuator upper position; 12b denotes the contact surface of the actuator 8 that is located at the actuator lower position; 11 denotes a contact point, located at a contact point standard position, between the rear end face 6 locating at the rear end face standard position and the contact surface 12 locating at the contact surface standard position; 11a denotes the contact point, located at a contact point upper position, between the rear end face 6a locating at the rear end face upper position and the contact surface 12a locating at the contact surface upper position; 11b denotes the contact point, located at a contact point lower position, between the rear end face 6b locating at the rear end face lower position and the contact surface 12b locating at the contact surface lower position; 4 denotes the mirror position detector (mirror posture detector); 5 denotes the rotary variable resistor; and 13 denotes a rotation shaft (rotation axis).

As shown in FIG. 3, the rear end face 6 of the mirror push-pull operation shaft 2 is a flat surface, and the contact surface 12 of the actuator 8 is of a circular arc in shape when viewed from a direction parallel to a direction in which the rotation shaft 13 extends. The mirror push-pull operation shaft 2 and the actuator 8 contact to each other with those surfaces 6, 12; 6a, 12a; 6b, 12b to form the contact point 11, 11a, 11b therebetween.

Figure 7:
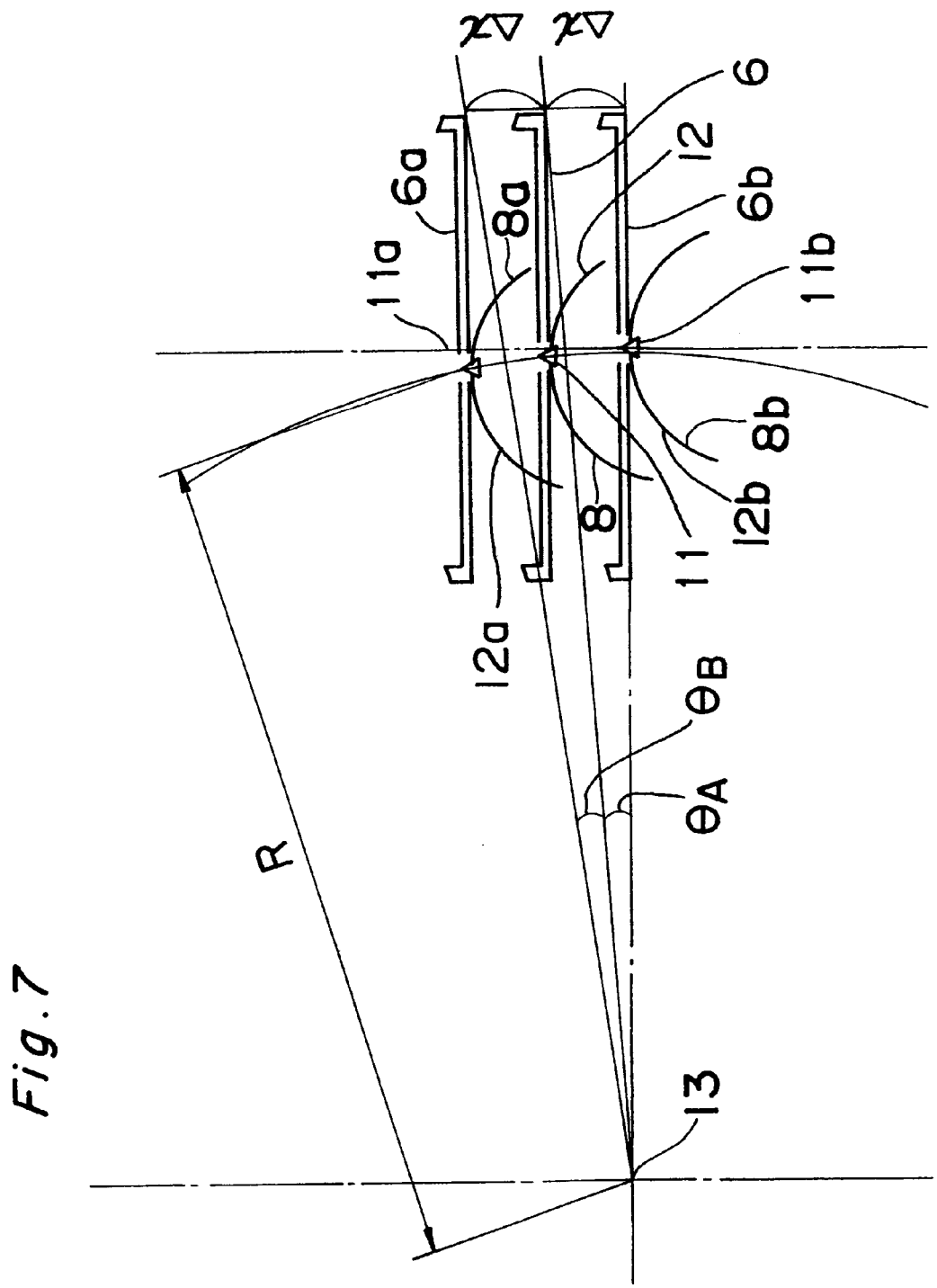
FIG. 7 is a schematic view showing a principle of how the mirror assembly for the automobile according to the embodiment of the present invention operates.

The actuator 8 is mounted to the rotation shaft 13 so that the circular-arced contact surface 12 of the actuator 8 extends along a rotational surface of the actuator 8, in which arrangement the actuator 8 rotates with a rotational radius R relative to a center of the rotation shaft 13, as shown in FIG. 7.

With the construction, when the mirror push-pull operation shaft 2 moves axially so that the rear end face 6 thereof at the rear end face standard position contacts the contact surface 12 of the actuator 8 at the actuator standard position, so that the rear end face 6a thereof at the rear end face upper position contacts the contact surface 12a of the actuator 8a at the actuator upper position, and so that the rear end face 6b thereof at the rear end face lower position contacts the contact surface 12b of the actuator 8b at the actuator lower position, the contact points 11, 11a, 11b therebetween are located at the contact point standard position, the contact point upper position, and the contact point lower position, respectively.

FIG. 4 is a side view of FIG. 3. In FIG. 4, a reference numeral 5 denotes the rotary variable resistor, 13 denotes the rotation shaft, 7 denotes a spring, 10 denotes a brush, 14 denotes a resistor with a particular pattern, 8 denotes the actuator, and 6 denotes the rear end face of the mirror push-pull operation shaft 2, where the rotary variable resistor 5 is a conventional device. The rotation shaft 13 is fixed to the brush 10, and the brush 10 has a contact point (not shown) at which the brush 10 makes a sliding contact with the patterned resistor 14. The spring 7 exerts a biasing force upon the brush 10 and the actuator 8, respectively, so as to bias the brush 10 against the patterned resistor 14 and so as to bias the actuator 8 against the rear end face 6 of the mirror push-pull operation shaft 2.

When the mirror push-pull operation shaft 2 moves in the axial direction, the actuator 8 is rotated about the rotation shaft 13. Accompanying this rotation of the shaft 13, the brush 10 of the rotary variable resistor 5 rotates while sliding with respect to the patterned resistor 14, so that the value of resistance of the rotary variable resistor 5 varies. Therefore, the position or posture of the mirror 1 can be detected by monitoring the value of resistance of the rotary variable resistor 5.

Next, with reference to FIG. 7, the mirror assembly for the automobile according to the embodiment of the present invention is described in detail.

Referring to the figure, as the mirror push-pull operation shaft 2 moves in the axial direction, the actuator 8 is rotated about the rotation shaft 13, as mentioned above. That is, the contact point 11 (11a, 11b) formed by the contact made between the flat rear end face 6 (6a, 6b) of the push-pull operation shaft 2, and the contact surface 12 (12a, 12b) of the actuator 8 (8, 8a, 8b), moves generally along the arc with the radius R that corresponds to a part of the circle around which the actuator 8 rotates. At this time, the contact point 11 (11a, 11b) therebetween moves along the arc-shaped contact surface 12 (12a, 12b) of the actuator 8 (8a, 8b) and along the flat rear end face 6 (6a, 6b) of the mirror push-pull operation shaft 2.

More specifically, the contact point 11 (11a, 11b) thereof slightly moves along the vicinity of the crest (or summit or apex) of the circular-arced contact surface 12 (12a, 12b) only by a small distance; on the other hand, the contact point 11 (11a, 11b) thereof slightly moves along the flat rear end face 6 (6a, 6b) thereof between an extremity corresponding to a center of the flat rear end face 6 (6a, 6b) and an extremity corresponding to a position nearer the center of the rotation shaft 13 relative to the center of the flat rear end face 6 (6a, 6b), only by a small distance, at the same time.

Accordingly, in case that the distance (or displacement) Δx between the rear end face upper position of the rear end face 6 and the rear end face standard position thereof is equal to the distance (or displacement) Δx between the rear end face lower position of the rear end face 6 and the rear end face standard position thereof, the angle "QA" that is formed between the actuator 8b locating at the actuator lower position and the actuator 8 locating at the actuator standard position, is generally equal to the angle "QB" that is formed between the actuator 8a locating at the actuator upper position and the actuator 8 locating at the actuator standard position. Therefore, when the mirror push-pull operation shaft 2 is linearly displaced or moved in the axial direction, the rotational angle of the actuator also varies generally linearly; as a result, the value of resistance of the rotary variable resistor 5 also varies generally linearly. Accordingly, the mirror position can be detected directly from the value of resistance of the rotary variable resistor 5 without using any complex converter circuit.

Next, referring to FIGS. 5 and 6, the description is made below upon the mirror assembly for the automobile according to the second embodiment of the present invention.

Figure 5:
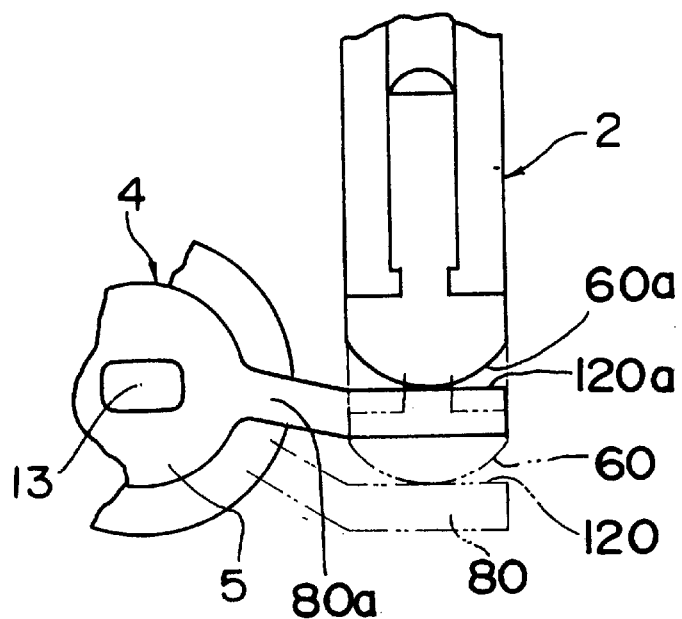
FIG. 5 is a plan view, as an explanatory view, of a main part of a mirror assembly for an automobile according to a second embodiment of the present invention, showing how it operates.
Figure 6:
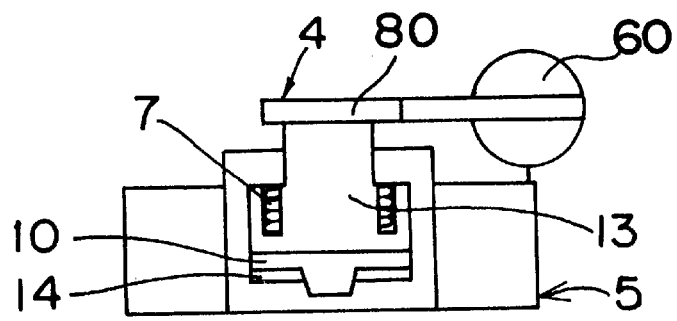
FIG. 6 is a side view of the main part of the mirror assembly for the automobile of FIG. 5.

FIG. 5 is a plan view, as an explanatory view, of a main part of the mirror assembly for the automobile according to the second embodiment of the present invention, showing how it operates; and FIG. 6 is a side view of the main part of the mirror assembly for the automobile of FIG. 5.

The mirror assembly for the automobile of the second embodiment differs from that of the foregoing first embodiment in that a rear end face 60 (60*a*) of a mirror push-pull operation shaft 2 of the second embodiment is formed into a circular-arced shape, whereas a contact surface 120 (120*a*) of an actuator 80 (80*a*) of the second embodiment is a flat surface. The rest of the basic construction of the second embodiment is the same that of the foregoing first embodiment.

In FIGS. 5 and 6, a reference numeral 60 designates the rear end face, locating at the rear end face standard position, of the mirror push-pull operation shaft 2; 60*a* designates the rear end face, locating at the rear end face upper position, of the mirror push-pull operation shaft 2; 120 is the contact surface, locating at the contact surface standard position, of the actuator 80 locating at the actuator standard position; and 120*a* is the contact surface, locating at the contact surface upper position, of the actuator 80*a* locating at the actuator upper position.

According to the construction, the contact point, between the rear end face 60 (60*a*) of the mirror push-pull operation shaft 2 and the contact surface 120 (120*a*) of the actuator 80 (80*a*), slightly moves along the vicinity of the crest (or summit or apex) of the circular-arced contact surface 60 (60*a*) only by a small distance; on the other hand, the contact point therebetween slightly moves along the flat rear end face 120 (120*a*) thereof only by a small distance, at the same time, as well.

Therefore, when the mirror push-pull operation shaft 2 is linearly displaced or moved in the axial direction, the rotational angle of the actuator 80 (80*a*) also varies generally linearly; as a result, the value of resistance of the rotary variable resistor 5 also varies generally linearly, as well as the mirror assembly for the automobile of the first embodiment. Accordingly, the mirror position or posture can be detected directly from the value of resistance of the rotary variable resistor 5 without using any complex converter circuit.

In the first and second embodiments of the present invention, one of the rear end face of the mirror push-pull operation shaft and the contact surface of the actuator, is formed arc-shaped, and the other thereof is formed flat in shape. As a modification to the first and second embodiments, both the rear end face 60 thereof and the contact surface 12 thereof can be formed arc-shaped, as shown in FIG. 2. With the construction according to the modification, it goes without saying that an effect and function, which is similar to the effect and function attained in the first and second embodiments of the present invention, is realized.

Although the present invention has been fully described in connection with the preferred embodiments thereof and modification of the preferred embodiments with reference to the accompanying drawings, it is to be noted that various changes and other modifications are appararent to those skilled in the art. Such changes and modifications are to be understood as included within the scope of the present invention as defined by the appended claims unless they depart therefrom.

What is claimed is:

1. A mirror assembly that is used for an automobile, comprising:

a mirror;

a push and pull operation shaft for tilting the mirror, in which one of ends of the push and pull operation shaft is connected to a rear side of the mirror, and in which the mirror is tilted when the push and pull operation shaft is moved in an axial direction of the push and pull operation shaft; and a posture detector, having a rotary actuator with a rotation axis, for detecting a posture of the mirror, in which the posture detector is provided on a side of the other of ends of the push and pull operation shaft, in which the rotary actuator has an end, opposite the rotation axis, with a contact surface that contacts a rear surface of the other of ends of the push and pull operation shaft, in which the posture detector comprises a rotary variable resistor, a rotation shaft of which is connected to the rotation axis of the rotary actuator, and in which the rotation axis thereof is perpendicular to the axial direction of the push and pull operation shaft, wherein one of the rear surface thereof and the contact surface thereof is a surface in a shape of a circular arc, in which the other of the rear surface thereof and the contact surface thereof is one of a surface in a shape of a circular arc and a flat surface, and in which the circular arc is within a rotation plane within which the rotary actuator is rotated.

2. A mirror assembly that is used for an automobile, comprising:

a push and pull operation shaft for tilting a mirror, in which the push and pull operation shaft has a rear end; and a rotary variable resistor, as a posture detector for detecting a position of the mirror, in which the rotary variable resistor has an actuator with a contact part that contacts the rear end of the push and pull operation shaft, wherein one of the rear end thereof and the contact part thereof has a surface in a shape of a circular arc, and in which the circular arc is within a rotation plane within which the actuator is rotated, and wherein an amount of movement of the push and pull operation shaft in an axial direction thereof generally linearly corresponds to an amount of rotation of the actuator.

\* \* \* \* \*